(12) United States Patent
Mall et al.

(10) Patent No.: US 8,434,216 B2
(45) Date of Patent: May 7, 2013

(54) METHODS AND SYSTEMS FOR IN-SITU MACHINE MAINTENANCE

(75) Inventors: Waheed Tony Mall, Halfmoon, NY (US); Robert Martin Roney, Jr., Schoharie, NY (US); Roderick Mark Lusted, Niskayuna, NY (US); Eric Buskirk, Guilderland, NY (US); James Thaddeus Henley, Saratoga Springs, NY (US); Paul C. Bagley, Middleburgh, NY (US); Gary Lindsey Stewart, Monroeville, PA (US); Kenneth John Hatley, Madison, NJ (US); Richard Michael Hatley, Convent Station, NJ (US); Peter John McGrath, Fairlawn, NJ (US)

(73) Assignee: General Electric Company, Schenectady, NY (US)

( * ) Notice: Subject to any disclaimer, the term of this patent is extended or adjusted under 35 U.S.C. 154(b) by 1521 days.

(21) Appl. No.: 11/970,939

(22) Filed: Jan. 8, 2008

(65) Prior Publication Data
US 2009/0172934 A1    Jul. 9, 2009

(51) Int. Cl.
*B23P 19/06* (2006.01)
*H02K 15/16* (2006.01)
*H02K 7/04* (2006.01)

(52) U.S. Cl.
USPC ........ 29/732; 29/402.03; 29/407.1; 29/426.3; 29/426.5; 29/762; 81/54; 73/458; 73/487

(58) Field of Classification Search ........... 73/458, 73/457, 874; 29/402.03, 402.09, 407.1, 426.1, 29/426.3, 426.5, 281.1, 732, 757, 762; 81/52, 81/54

See application file for complete search history.

(56) References Cited

U.S. PATENT DOCUMENTS

| | | | |
|---|---|---|---|
| 4,513,619 | A | 4/1985 | Widdall |
| 4,879,792 | A | 11/1989 | O'Connor |
| 5,011,374 | A | 4/1991 | Miller |
| 5,140,856 | A | 8/1992 | Larsen |
| 5,219,454 | A | 6/1993 | Class |

(Continued)

FOREIGN PATENT DOCUMENTS

| | | |
|---|---|---|
| DE | 202004012356 U1 | 10/2004 |
| EP | 1870988 A1 * | 12/2007 |
| JP | 56103956 A | 8/1981 |
| WO | 2007147679 | 12/2007 |

OTHER PUBLICATIONS

Foreign Search Report related to application GB0823014.6 dated Apr. 16, 2009.

*Primary Examiner* — Erica E Cadugan
(74) *Attorney, Agent, or Firm* — Armstrong Teasdale LLP

(57) ABSTRACT

Methods and systems for maintaining a machine using an in-situ vehicle (IV) is provided. The IV may be used with a machine that includes a work-piece and an interference body positioned proximate a surface of the work-piece such that a relatively small gap extends between the work-piece and the interference body. The method includes transporting the IV from external to the machine into the gap, positioning the IV in the gap such that at least a portion of the IV circumscribes a work area of the work-piece, locking the IV between the work-piece and the interference body, and manipulating a tool coupled to the IV from external to the machine, the tool configured to transfer a component between the work-piece and a storage cassette on the IV.

12 Claims, 9 Drawing Sheets

U.S. PATENT DOCUMENTS

| | | |
|---|---|---|
| 5,463,900 A | 11/1995 | Schierling et al. |
| 5,537,861 A | 7/1996 | Seitelman et al. |
| 5,711,652 A | 1/1998 | Van De Venne et al. |
| 5,988,978 A | 11/1999 | Pearce |
| 6,100,711 A * | 8/2000 | Hatley .................... 324/765.01 |
| 6,525,518 B1 | 2/2003 | Garnaes |
| 7,954,376 B2 * | 6/2011 | Angantyr et al. ............... 73/458 |

* cited by examiner

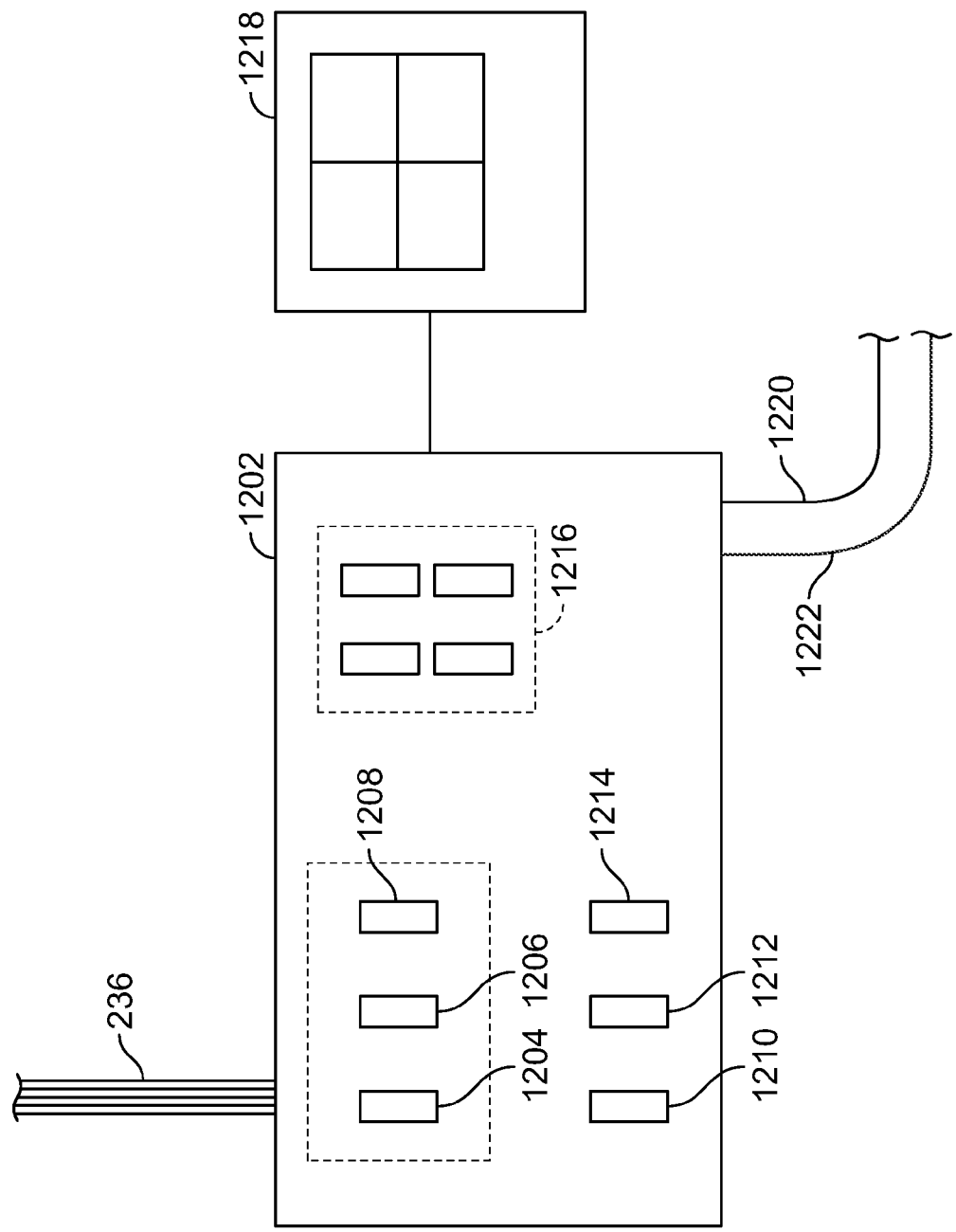

METHODS AND SYSTEMS FOR IN-SITU MACHINE MAINTENANCE

BACKGROUND

This invention relates generally to rotatable machines and more particularly, to methods and systems for in-situ balancing of rotors of rotatable machines.

During the lifetime of a rotating machine, periodic balancing of the rotating member is performed. During operation of a mechanical machine such as a fan or turbine, wear or damage may induce a vibration in the machine. For an electrical machine such as a generator or motor an increase in vibration may be due to copper shorts. Additionally, repair to a rotor such as a rewind or machining may also alter the center of gravity of the rotor resulting in an increase in vibration. To reduce the vibration of the operating machine, an imbalance is quantified and canceling weights are generally attached, removed, or moved on the rotor to counter the imbalance. Typically the rotor is removed from the machine and delivered to a specialized shop with a balance pit or bunker to be balanced. Such maintenance is labor intensive and must generally be scheduled with the balance shop well in advance of the balance procedure. The logistics of transporting a large relatively delicate component also affects the cost and timeliness of an outage when the rotor is to be maintained. Additionally, the process of transporting the rotor carries inherent risks to the health and physical safety of the rotor.

SUMMARY

In one embodiment, a method of maintaining a machine using an in-situ vehicle (IV) includes transporting the IV from external to the machine into the gap, positioning the IV in the gap such that at least a portion of the IV circumscribes a work area of the work-piece, locking the IV between the work-piece and the interference body, and manipulating a tool coupled to the IV from external to the machine, the tool configured to transfer a component between the work-piece and a storage cassette on the IV. The IV may be used with a machine that includes a work-piece and an interference body positioned proximate a surface of the work-piece such that a relatively small gap extends between the work-piece and the interference body.

In another embodiment, an in-situ vehicle (IV) system for maintaining a machine includes a vehicle body positionable in the machine from external to the machine, a positioner coupled to the vehicle body and configured to position a storage cassette in x and y directions with respect to the vehicle body, and an insertion and removal tool storable within the vehicle body and extendable to a working position away from the vehicle body, the tool is configured to engage a component in the machine to couple and decouple the component from the machine.

In yet another embodiment, an in-situ vehicle (IV) system for balancing an electrical machine includes a vehicle body sized to traverse a gap between a rotor of the machine and a stator of the machine, a control panel coupled to the vehicle through an umbilical, a manipulator coupled to the vehicle body and configured to permit the vehicle body to be moved within the machine from external of the machine, and a shaft coupled to a tool onboard the vehicle wherein the shaft is configured to receive torsional input from a user to operate the tool.

BRIEF DESCRIPTION OF THE DRAWINGS

FIG. 12 is a schematic block diagram of a control panel that may be used with the in-situ vehicle in accordance with an exemplary embodiment of the present invention.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of maintaining the internal components of a machine while the machine is substantially fully assembled or only partially disassembled. However, it is contemplated that this disclosure has general application to maintaining and inspecting various types of industrial and commercial devices having positions and components that may be difficult to access without significant disassembly.

Figure 1:
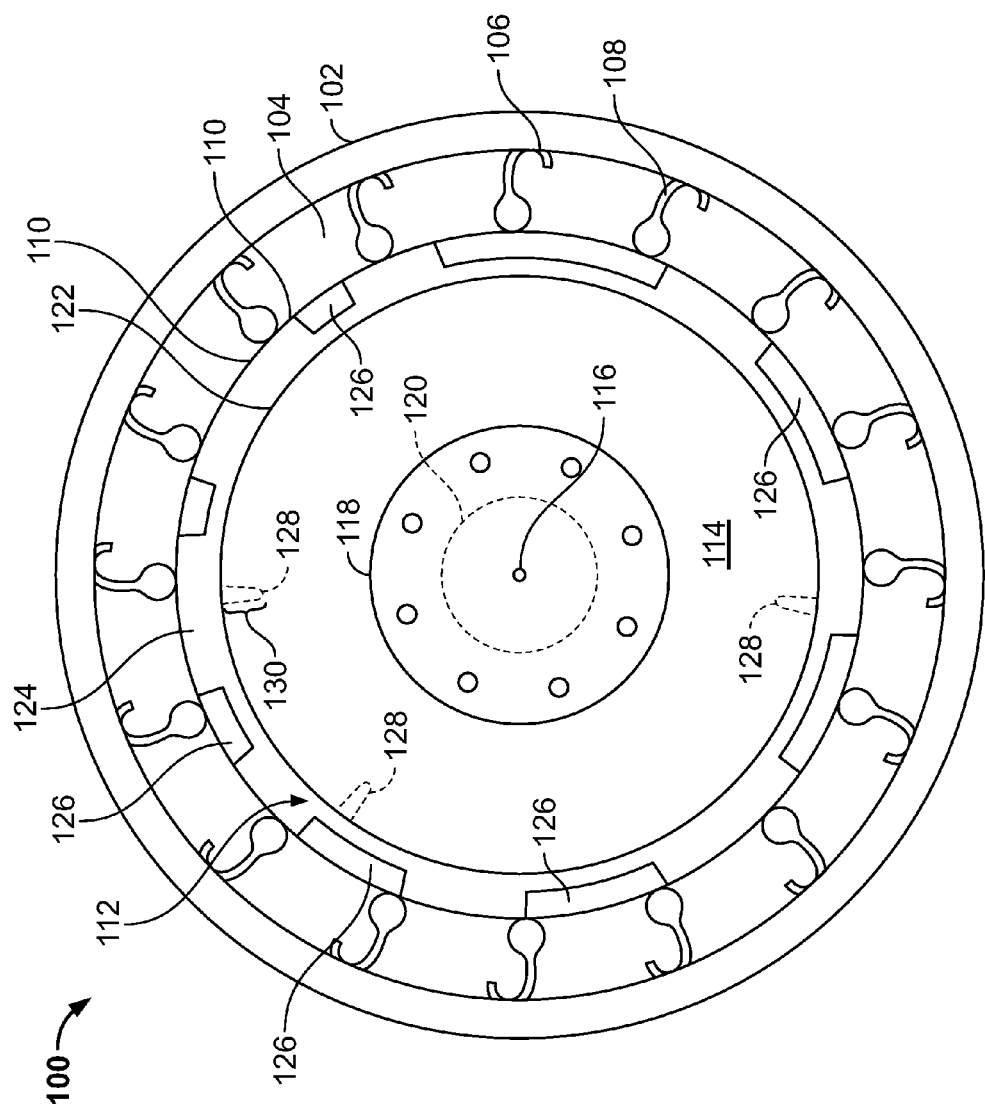
FIG. 1 is a perspective end view of a rotatable machine in accordance with an exemplary embodiment of the present invention.

FIG. 1 is a perspective end view of a rotatable machine 100 in accordance with an exemplary embodiment of the present invention. In the exemplary embodiment, rotatable machine 100 includes a stationary stator body 102 surrounding a core 104 interposed with a plurality of slots 106 for carrying stator windings about core 104. End turns 108 may be used to join adjacent windings and/or join windings into electrical poles. Core 104 includes a radially inner circumferential surface 110 that defines a bore 112 therethrough. A rotor 114 is concentrically disposed within bore 112 and is rotatable about a longitudinal axis 116 extending into FIG. 1. Rotor 114 includes a coupling configured to permit a shaft 120 to be coupled to a prime mover (not shown) or exciter. Rotor 114 also includes a radially outer surface 122. A gap 124 is defined between surface 110 and surface 122 that permits a flow of cooling gas, for example, air or hydrogen during operation. A plurality of baffles 126 may be positioned within gap 124 to direct gas flow into predetermined areas of gap 124 to facilitate cooling. In the exemplary embodiment, baffles 126 extend radially inwardly from stator body 102 into gap 124. Rotor 114 also includes a plurality of inwardly radially directed holes 128 that are circumferentially spaced about surface 122 and extend into rotor 114 a distance 130. Holes 128 are generally positioned about a full length (not shown in FIG. 1) of rotor 114. Holes 128 may be threaded or otherwise configured to receive one or more balance weights. End covers, a bearing, bearing lubricating system piping and/or field brush rigging which may be positioned proximate the end of generator 100 are not shown for clarity, however would be in place during the in-situ inspection described in more detail below.

Figure 2:
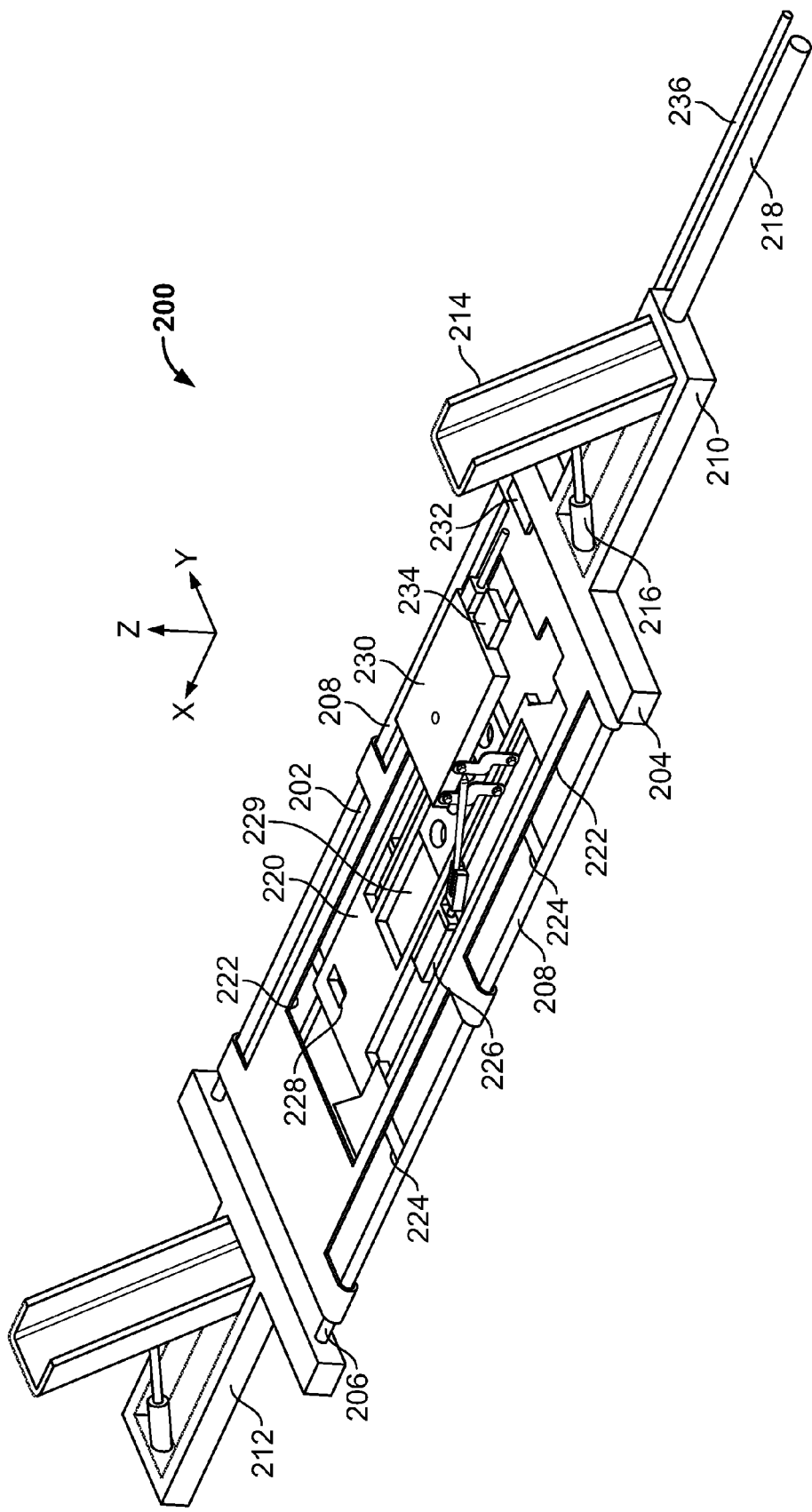
FIG. 2 is a perspective view of an exemplary in-situ balance weight maintenance vehicle in accordance with an embodiment of the present invention.
Figure 3:
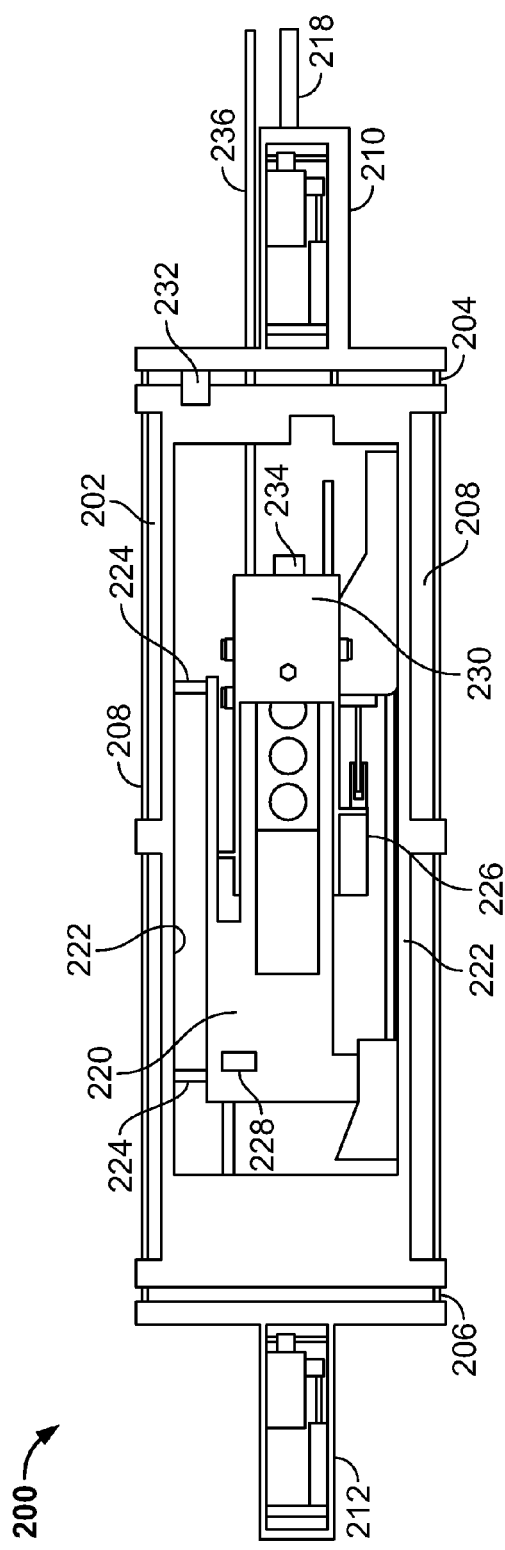
FIG. 3 is a plan view of the vehicle shown in FIG. 2.

FIG. 2 is a perspective view of an exemplary in-situ vehicle (IV) 200 in accordance with an embodiment of the present invention. FIG. 3 is a plan view of vehicle 200 shown in FIG. 2. Vehicle 200 is configured to be slid into gap 124 and guided by an operator external to machine 100 into a position proximate one of holes 128. In the exemplary embodiment, vehicle 200 is configured to be slid into machine 100 on a vertically upward side of rotor 114. To this end, a hole 128 that contains weights that are to be removed or that to which weights will be added is positioned in a vertically upward position by rotating rotor 114 until the desired hole 128 is in the vertically upward position. Vehicle 200 includes a body 202 including a head member 204 and foot member 206 and a pair of channels 208 extending therebetween. A head-endlocking device 210 is coupled to head member 204 and a substantially similar foot-end locking device 212 is coupled to foot member 206. Each locking device 210 and 212 includes a locking finger 214 and a locking actuator 216. In the exemplary embodiment, locking actuator 216 is a pneumatic piston actuator, however a motor/leadscrew, an inflatable bladder, and other devices configured to lock vehicle 200 into a substantially fixed position between surface 110 and surface 122 are contemplated. A manipulator rod 218 is coupled to a distal end of head end locking device 210. Manipulator rod 218 permits an operator external to machine 100 to manipulate vehicle 200 into position over the desired hole 128. In an alternative embodiment, an electrical or pneumatic driven motor is coupled to a crawler assembly that is configured to transport vehicle 200 into position over desired hole 128.

A positioning frame 220 is positionable in an X-direction and a Y-direction with respect to body 202. Positioning frame 220 is slidable in each of the X-direction and Y-direction on respective sets of rails extending between head member 204 and foot member 206, and extending between channels 208, respectively. Specifically, positioning frame 220 is slidable in the X-direction along rails 222 extending between head member 204 and foot member 206 and in the Y-direction along rails 224 extending between channels 208. Positioning frame 220 is driven in the X-direction by a first leadscrew assembly 226 and in the Y-direction by a second leadscrew assembly 228. Positioning frame 220 includes a weight cassette 229 configured to store balance weights that are not currently being used, to receive weights that are being removed from desired hole 128, and to hold weights that are being inserted into desired holes 128.

Vehicle 200 also includes a weight maintenance tool 230 that is movable in a Z-direction from a storage position within body 202 to a working position radially displaced outwardly from desired hole 128. A first video camera 232 is coupled to head member 204 with its field of view directed axially toward foot end and tilted radially inwardly towards the work area beneath tool 230 when in the working position. A second video camera 234 is coupled to tool 230 and its field of view is directed radially inwardly towards the work area.

Vehicle 200 is supplied with air for the pneumatic cylinders, electrical power for the leadscrew assembly motors and cameras, and video control and video signal pathways via an umbilical 236.

Figure 4:
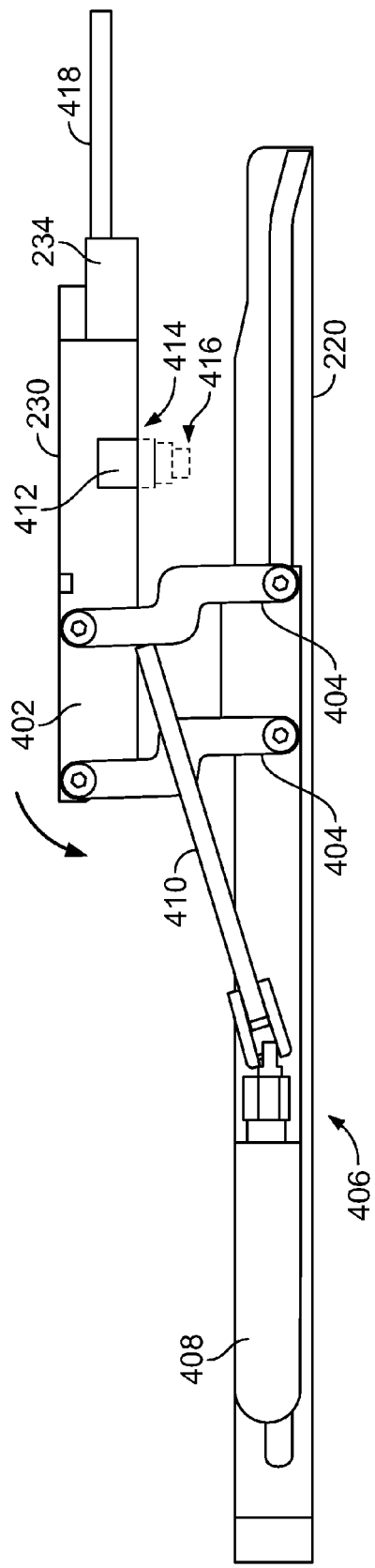
FIG. 4 is an enlarged side elevation view of a portion of the vehicle with a weight maintenance tool extended to a working position.
Figure 5:
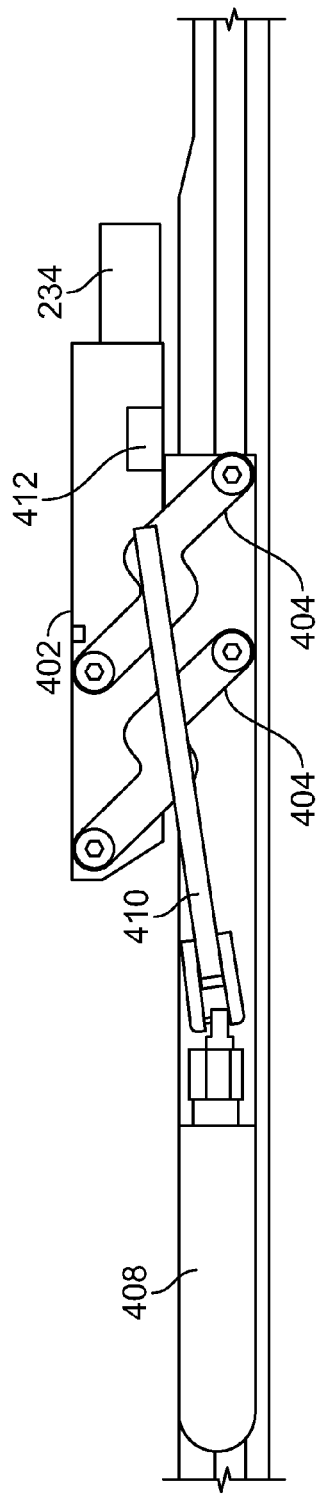
FIG. 5 is another enlarged side elevation view of a portion of vehicle with the weight maintenance tool extended in an intermediate position between a storage position and the working position

FIG. 4 is an enlarged side elevation view of a portion of vehicle 200 with weight maintenance tool 230 extended to a working position. FIG. 5 is another enlarged side elevation view of a portion of vehicle 200 with weight maintenance tool 230 extended in an intermediate position between a storage position and the working position. In the exemplary embodiment, tool 230 includes a power transmission device such as a gearbox body 402 movably coupled to positioning frame 220 through a plurality of pivotable linkages 404. Gearbox body 402 is movable through an actuator assembly 406 operably coupled to positioning frame 220. In the exemplary embodiment, actuator assembly 406 includes a pivot motor 408 and a pivot leadscrew 410. Gearbox body 402 includes a radially inwardly directed tool head 412 that is retractable into gearbox body 402 in a storage or transport position 414 and extendable to a working position 416 (shown in broken lines FIG. 4). Tool head 412 may include a plurality of different tools that are interchangeable and provide different capabilities for maintaining the balance weights of machine 100 or other components within machine 100 that are not easily accessible from external to machine 100. In the exemplary embodiment, tool head 412 includes a flat head screwdriver head tool. In other embodiments, tool head 412 may include but is not limited to a hex head tool, a socket wrench tool, an adhesive or insulator application tool, and a cutting tool. In the exemplary embodiment, the flat head screwdriver head tool is powered by an operator manually through a rotatable shaft 418 having a grip end (not shown in FIG. 4) distally located external to machine 100 and an opposing attachment end rotatably coupled to gearbox body 402. Rotation of shaft 418 rotates tool head 412 such that balance weights that include threaded engagement portions may be threaded and unthreaded from threaded hole 128.

Figure 6:
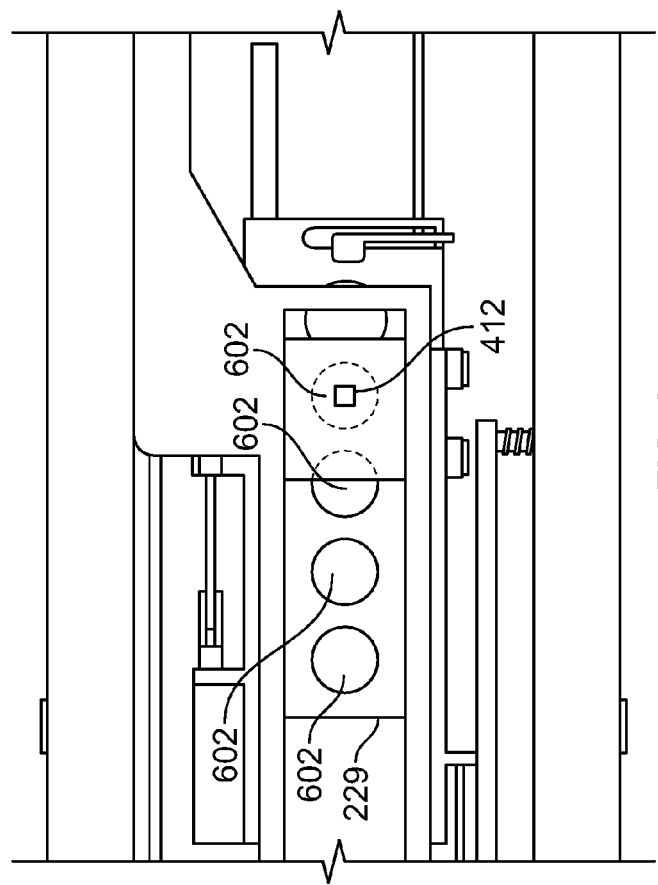
FIG. 6 is an enlarged plan view of a portion of the vehicle looking radially outward from a surface.
Figure 7:
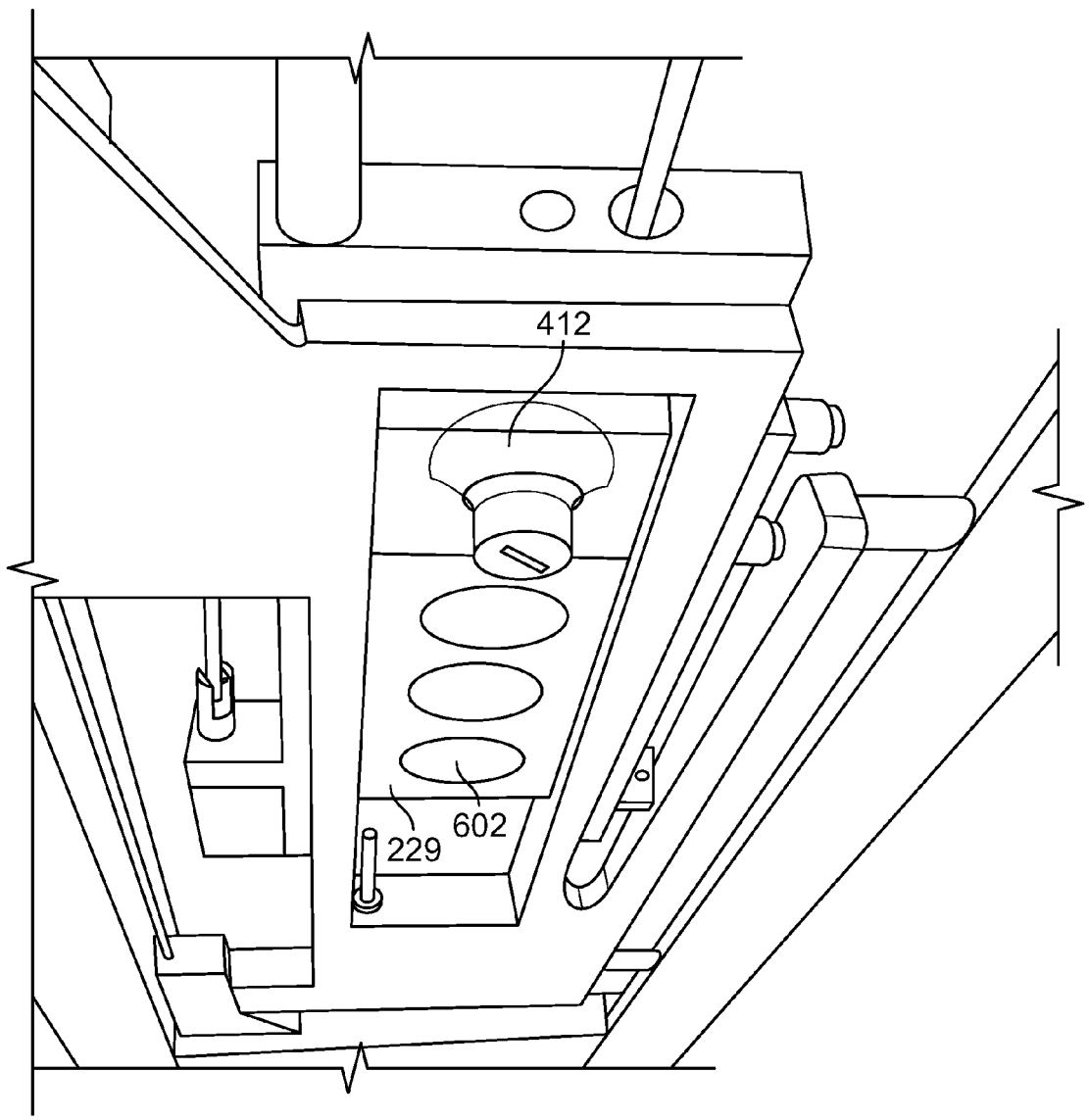
FIG. 7 is a perspective view from below of head tool in accordance with an exemplary embodiment of the present invention.

FIG. 6 is an enlarged plan view of a portion of vehicle 200 looking radially outward from surface 122. FIG. 7 is a perspective view from below of head tool 412 in accordance with an exemplary embodiment of the present invention. In the exemplary embodiment, cassette 229 includes a rectangular body that is positionable with respect to tool head 412 to align one of a plurality of weight storage locations 602 with tool head 412. During operation, for example, to remove a weight from hole 128, head tool 412, an empty weight storage location 602, and hole 128 are aligned using positioning frame 220. Camera 234 (shown in FIG. 5) is used to display live video of the relative positions of head tool 412, empty weight storage location 602 and hole 128. Head tool 412 is extended to engage the weight in hole 128. The operator applies a rotational force to shaft 418 using the grip end. The rotational force is transmitted through gearbox 402 to the head of the weight, which backs the weight out of hole 128. The weight is sufficiently long to span the distance between surface 122 and cassette 229 such that before the threads on the weight completely disengage from hole 128 the threads have begun engagement of the threads in empty storage location 602 so that the weight is always thread-captured by the hole 128 or a storage location 602. Such capture prevents the weight from falling into machine 100, from where it would have to be retrieved.

Figure 8:
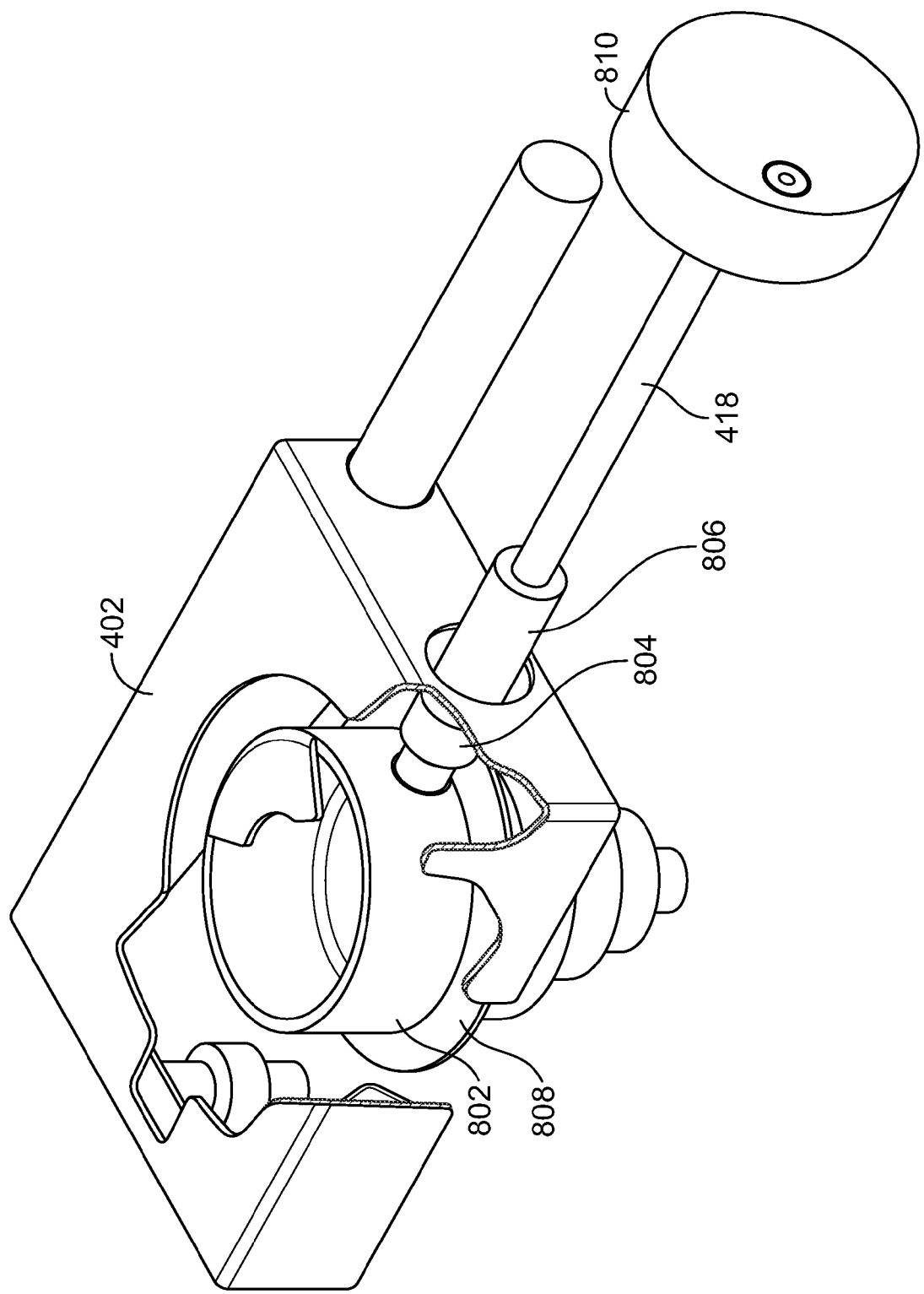
FIG. 8 is an enlarged partially cut-away view of a gearbox body in accordance with an embodiment of the present invention.

FIG. 8 is an enlarged partially cut-away view of gearbox body 402 in accordance with an embodiment of the present invention. In the exemplary embodiment, gearbox body 402 includes a gear assembly 802 coupled in rotational engagement between shaft 418 and tool head 412 (not in view in FIG.

8). In the exemplary embodiment, gear assembly 802 includes a pinion gear 804 coupled to an attachment end 806 of shaft 418. Pinion gear 804 meshes with a bull gear 808 that is coupled to tool head 412. As pinion gear 804 rotates bull gear 808 and tool head 412 are driven to rotate correspondingly. Because of the direct mechanical linkage between the threaded weight and the grip end 810 being manipulated by the user, the user receives feedback on the engagement of the threads of the weight with the threads of hole 128 by feel, thus minimizing the risk of cross threading.

Figure 9:
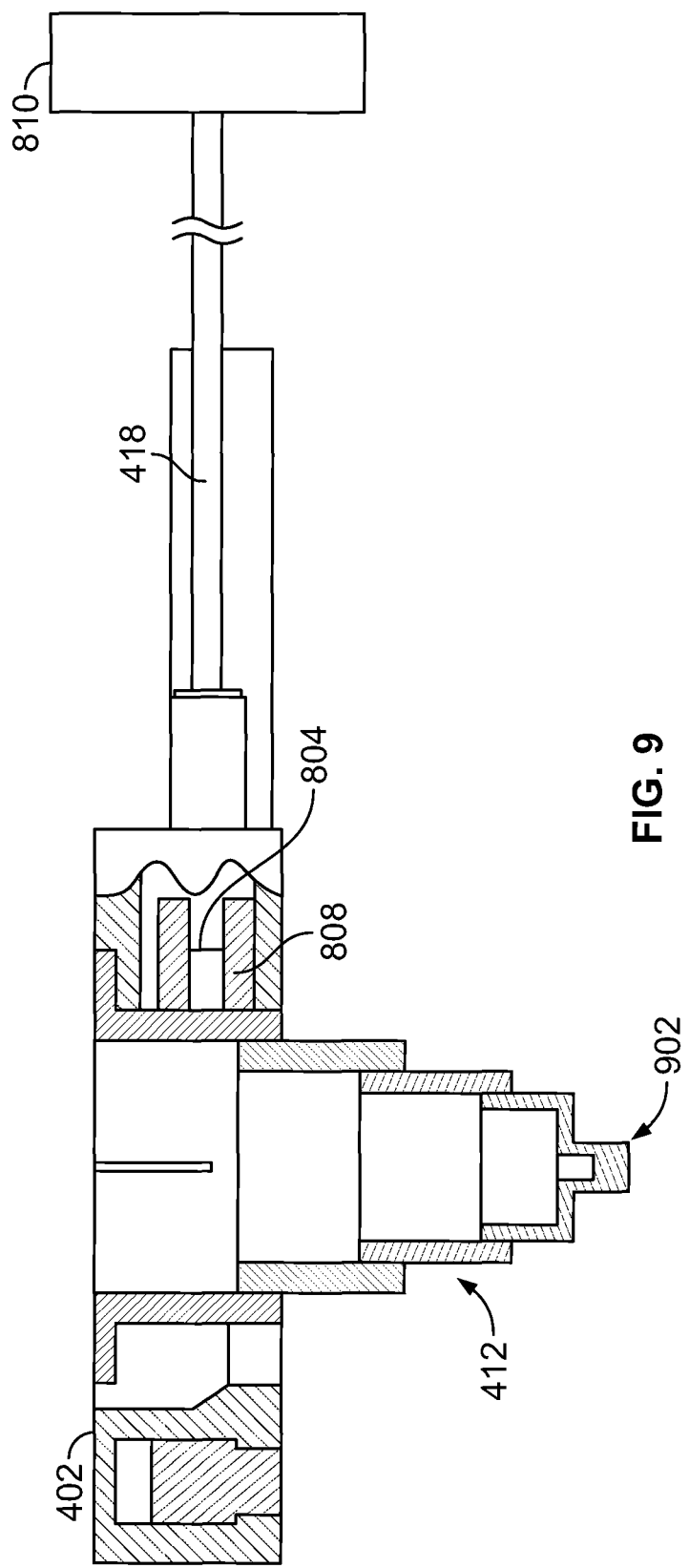
FIG. 9 an enlarged partially cut-away side elevation view of the gearbox body in accordance with an embodiment of the present invention.

FIG. 9 is an enlarged partially cut-away side elevation view of gearbox body 402 in accordance with an embodiment of the present invention. In the exemplary embodiment, tool head 412 includes a flat head screwdriver head tool 902 and is extended to a working position. In the exemplary embodiment, tool head is biased to the working position using for example, but not limited to a spring, pneumatic pressure inside tool head 412, or gravity. Tool head 412 is retractable using a cable that is manually operated from external to machine 100, a spring, and a vacuum pressure inside tool head 412. In various embodiments, tool head 412 is mechanically latched in the fully extended, the fully retracted, or intermediate positions.

Figure 10:
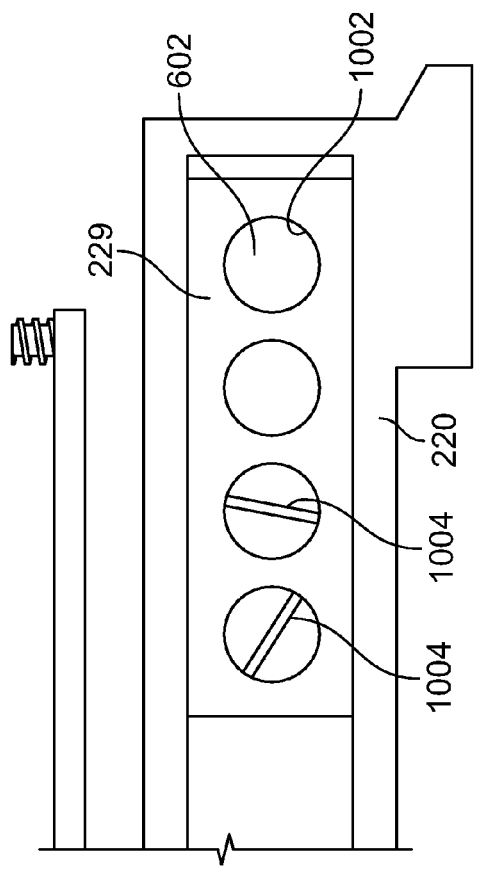
FIG. 10 is an enlarged plan view of a portion of the vehicle including a storage cassette.
Figure 11:
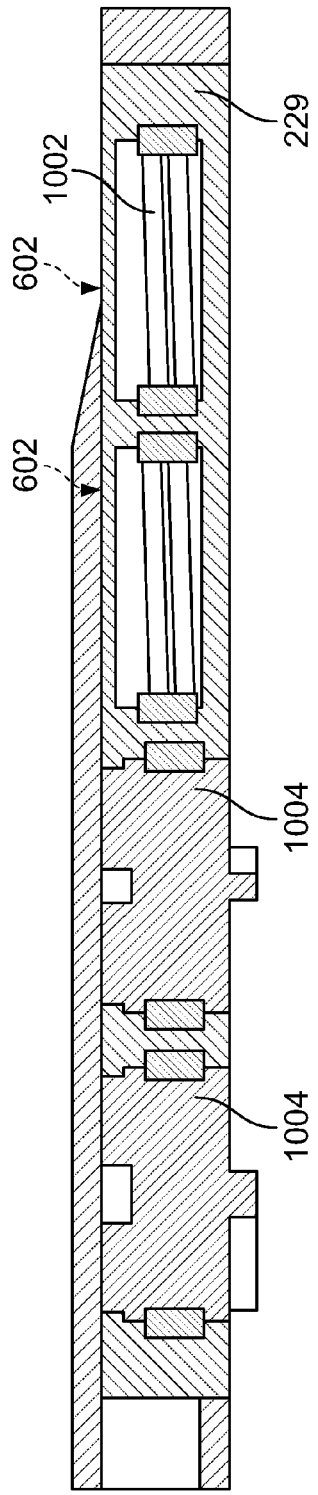
FIG. 11 is a side elevation view of the cassette.

FIG. 10 is an enlarged plan view of a portion of vehicle 200 including cassette 229. FIG. 11 is a side elevation view of cassette 229. In the exemplary embodiment, cassette 229 includes four storage locations 602. In an alternative embodiment, any number of storage locations may be used. Also in the exemplary embodiment, each storage location 602 includes a threaded inner surface 1002 sized to engage a balance weight 1004. Balance weight 1004 is threaded complementarily to threaded surface 1002.

FIG. 12 is a schematic block diagram of a control panel 1202 that may be used with in-situ vehicle 200 in accordance with an exemplary embodiment of the present invention. In the exemplary embodiment, control panel 1202 includes a plurality of controls for operating in-situ vehicle 200. Control panel 1202 includes a control 1204 for engaging locking fingers 214, a control 1206 for moving positioning frame 220 along an X-direction, a control 1208 for moving positioning frame 220 along an Y-direction. Control panel 1202 includes a control 1212 for extending and retracting gearbox body 402 and a control 1214 for extending and/or retracting tool head 412. Control panel 1202 further includes a camera control portion 1216 for adjusting video cameras 232 and 234 and a video monitor 1218. Camera control portion 1216 may include but is not limited to a camera zoom, focus, tilt, and an illumination control. The controls may comprise electrical switches, rheostats, and valves for controlling pneumatically operated actuators. Umbilical 236 includes signal conduits such as but not limited to wires, fiber optics, and tubing that extend between control panel 1202 and vehicle 200. Umbilical 236 is configured to transmit data from the vehicle body. In some embodiments, some of the signals are carried wirelessly between control panel 1202 and vehicle 200. Pneumatic and electrical sources 1220 and 1222, respectively, are coupled to control panel 1202 to power the components described above.

While embodiments of the disclosure have been described in terms of various specific embodiments, it will be recognized that the embodiments of the disclosure can be practiced with modification within the spirit and scope of the claims.

What is claimed is:

1. An in-situ vehicle (IV) system for use in maintaining a machine, said system comprising:
    a vehicle body positionable in the machine from external to the machine;
    a positioner coupled to said vehicle body and configured to position a storage cassette, adapted to store a plurality of components of the machine each in a respective one of a plurality of storage locations of the storage cassette, in a linear X-direction that extends along a longitudinal direction of said vehicle body and a linear Y-direction that is transverse with respect to the longitudinal direction of said vehicle body, independently, with respect to said vehicle body; and
    an insertion and removal tool for selectively inserting any one of the components from the storage cassette into the machine and removing the one of the components from the machine, said insertion and removal tool storable within the vehicle body and extendable to a working position away from said vehicle body, said tool configured to engage the one component in the machine to couple and decouple the one component from the machine.

2. A system in accordance with claim 1 further comprising one or more locking fingers coupled to said vehicle body and extendable therefrom to engage the machine.

3. A system in accordance with claim 1 further comprising:
    a first locking finger and a second locking finger, each of said first locking finger and said second locking finger coupled to said vehicle body and selectively extendable therefrom to engage the machine;
    a first actuator coupled between said vehicle body and said first locking finger, said first actuator is controllable externally from the machine to selectively extend and retract said first locking finger;
    a second actuator coupled between said vehicle body and said second locking finger, wherein said second actuator is controllable from external to the machine to extend and retract said second locking finger.

4. A system in accordance with claim 1 further comprising a video imager having a field of view that includes the one component with the tool in the working position.

5. A system in accordance with claim 1 further comprising an umbilical extending from said vehicle body to external of the machine, said umbilical configured to transmit control signals to said vehicle body, said umbilical configured to transmit data from said vehicle body.

6. A system in accordance with claim 1 wherein said storage cassette comprises a first capture device that is complementary to the one component and is of a same type as a second capture device within the machine.

7. A system in accordance with claim 1 wherein said insertion and removal tool comprise a tool head extendable from said insertion and removal tool when the insertion and removal tool is in the working position, said tool head configured to engage the one component in the machine to couple and decouple the one component from the machine.

8. An in-situ vehicle system for balancing an electrical machine, said system comprising:
    a vehicle body configured to traverse a gap between a rotor of the machine and a stator of the machine;
    a control panel coupled to said vehicle body through an umbilical;
    a manipulator coupled to said vehicle body and configured to permit said vehicle body to be moved within the machine from external of the machine; and
    a rotatable shaft coupled to a tool onboard said vehicle body, said shaft having a grip end configured to be gripped and manually rotated by a user when the vehicle body is within the machine in order to provide manual torsional input from a user to operate said tool.

9. A system in accordance with claim 8 further comprising at least one video camera having a field of view that facilitates positioning said vehicle body in the machine and facilitates engagement of the tool onto a work-piece of the rotor.

10. A system in accordance with claim 8 wherein said control panel comprises a video display communicatively coupled to a video camera mounted on said vehicle body.

11. A system in accordance with claim 8 wherein said vehicle body comprises one or more locking fingers configured to engage the stator.

12. A system in accordance with claim 8 wherein said tool comprises a gearbox configured to receive the manual torsional input from the user and transmit the manual torsional input to a tool head configured to engage a component in the machine.

\* \* \* \* \*